July 9, 1935.  A. R. WEIS ET AL  2,007,414
SEAL FOR ROTATING SHAFTS
Filed Sept. 25, 1933
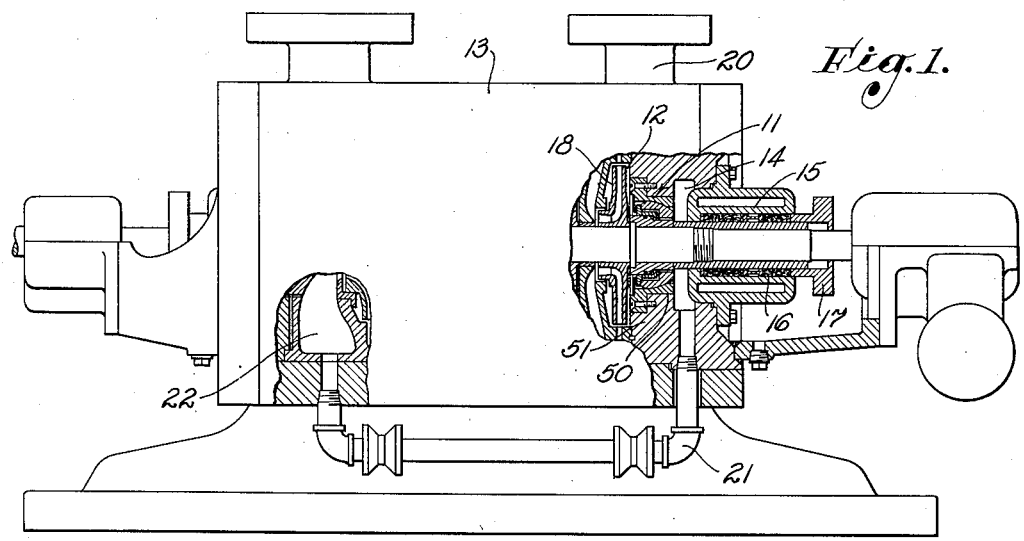
Fig.1.
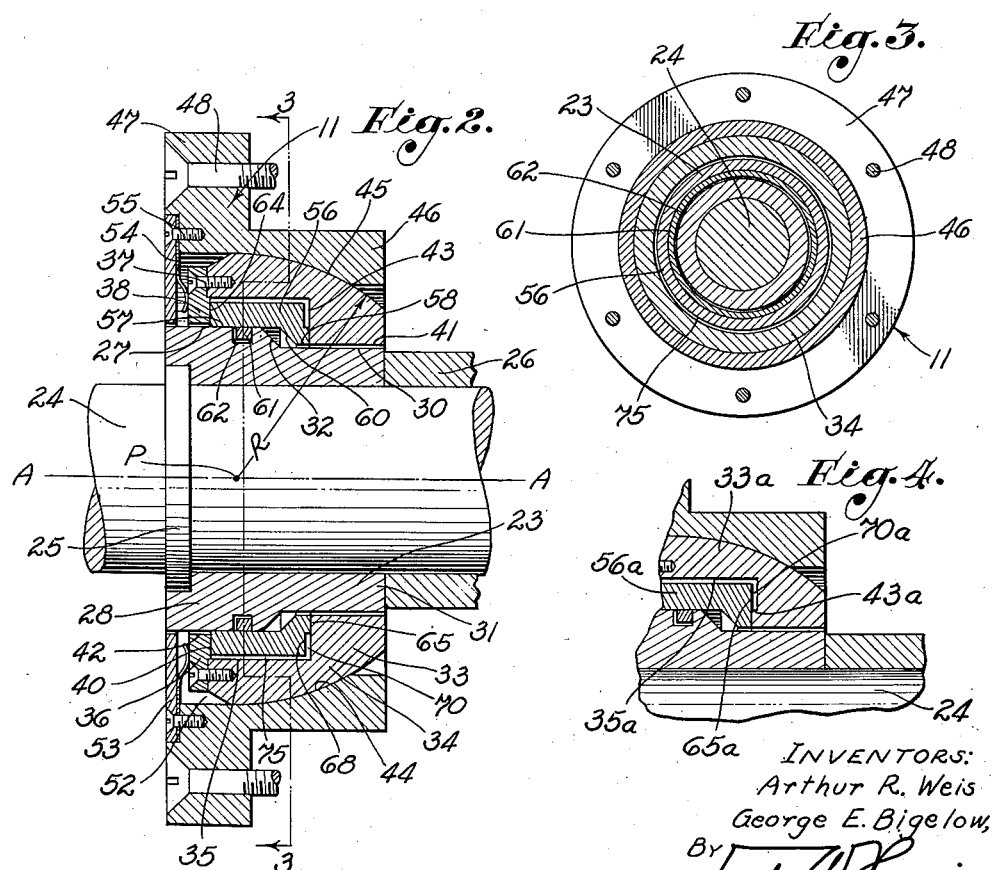
Fig.2.
Fig.3.
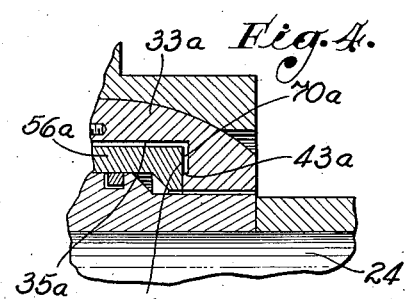
Fig.4.
INVENTORS:
Arthur R. Weis
George E. Bigelow,
By Fred W Lewis
ATTORNEY.

Patented July 9, 1935

2,007,414

UNITED STATES PATENT OFFICE 2,007,414

SEAL FOR ROTATING SHAFTS

Arthur R. Weis, Huntington Park, and George E. Bigelow, Southgate, Calif., assignors of one-half to Pacific Pump Works, Huntington Park, Calif., a corporation of California Application September 25, 1933, Serial No. 690,815

14 Claims. (Cl. 286—9)

Our invention relates to a sealing device for resisting a flow of fluid along a shaft or similar rotary member where such member passes from a high pressure chamber into a low pressure chamber, and relates particularly to a floating seal so constructed that the wear upon the parts thereof will be maintained at a minimum and the leakage of fluid through the sealing device will be much less than in previously used sealing devices having the same utility.

Although our invention is useful in a relatively large number of devices, its present principal utility is in high pressure oil pumps, especially high pressure pumps employed for pumping hot oils from one stage of a refining process to another, and accordingly it is believed that the invention may be best exemplified by disclosing an embodiment thereof particularly suited to this use.

Superheated fluids at high pressure are found to be relatively destructive to packing materials which are employed at the ends of hot oil pumps for forming a relatively non-leaking seal around the shaft, and accordingly it is customary to form a chamber between the high pressure stage of such pump and the packing device at the high pressure end of the pump, which chamber is connected to the intake of the pump so that the pressure in such chamber, and likewise the fluid pressure exerted on the packing device, will not be the high pressure at which fluid is discharged from the pump but will be the same as the intake pressure of the pump. Around the shaft where it passes from the above-mentioned pressure releasing chamber into the high pressure space or stage of the pump, a sealing device, ordinarily termed the balancing or throttle valve, is placed, this sealing device having the function of reducing to a minimum the flow of hot oil from the high pressure stage or space of the pump into the chamber situated between the sealing device and the packing device at the high pressure end of the pump structure. The form of sealing device or throttle valve which appears to have been most extensively employed consists of a hard metal sleeve mounted on the shaft in a position to operate in a closely fitting hard metal sleeve secured in the dividing wall of the pump structure, the clearance between these two sleeves being kept at a very small dimension, such as from three-thousandths to ten-thousandths of an inch, so that leakage through the throttle valve will be maintained at a relatively low value.

An object of our invention is to provide a sealing device or throttle valve of the above character which will operate with less friction than the previously known devices of the same character, and which will materially reduce the leakage from the high pressure chamber or zone to the low pressure chamber or zone. A sealing device of the formerly employed type, considered satisfactory in a hot oil pump operating at a pressure of 2000 pounds per square inch, permitted a leakage of twelve gallons per minute. Our new sealing device under the same conditions of operation reduced the leakage to between three and four gallons per minute.

It is a further object of the invention to provide a sealing or throttling device of the above character having a sealing part which operates in a balanced condition and is accordingly automatically adjusted to a proper position of operation when the pump shaft moves for any reason, such as expansion due to change in temperature of the pump parts, from one relative position of operation to another.

A further object of the invention is to provide a sealing or throttling device of the above character, in which the cooperating relatively movable faces producing the throttling effect of the device are reduced to a minimum so that the frictional load incurred thereby is likewise reduced. In the preferred form of the invention a pair of inner and outer relatively rotatable parts are employed, one of these parts having an annular recess therein facing the other of the parts, in which recess a balanced sealing means is operative to produce the desired results.

It is an object of the invention to provide a device of this character having a floating sealing ring or sleeve operating in a recess in a relatively stationary member which is mounted so that it may have sufficient universal movement to permit alignment of the walls of the recess therein with the sealing ring and the shaft on which the sealing ring is mounted.

Further objects and advantages of the invention will be made evident throughout the following part of the specification.

Referring to the drawing, which is for illustrative purposes only.

Fig. 1 is a view of a hot oil pump, partly sectioned to show the manner in which our invention is employed therein.

Fig. 2 is an enlarged view of the preferred embodiment of the sealing or throttling device shown in Fig. 1.

Fig. 3 is a cross section to reduced scale on a plane represented by the line 3—3 of Fig. 2.

Fig. 4 is a fragmentary detail showing an alternative manner in which the pressure chamber may be formed at the rearward end of the floating sealing ring.

The sealing device 11 shown in Figs. 1 and 2 has the utility of minimizing leakage of fluid from a high pressure space or zone 12 within a pump 13 to a low pressure or pressure-relieving space 14 formed adjacent the inner end of a packing device 15 of customary form having rings of packing material 16 compressed therein by a gland 17. The space 12 constitutes the final stage or chamber of the pump 13 in which the last impeller 18 rotates. This space 12 is accordingly filled with fluid or liquid under pressure the same as the pressure of fluid which is discharged through the outlet 20 of the pump 13. To keep this high pressure of fluid in the space 12 from being exerted directly against the packing material 16 of the device 15, the chamber 14 is connected through piping 21 with the intake space 22 at the front end of the pump 13 in which fluid exists at intake pressure, which may be 200 pounds per square inch or less, whereas the discharge pressure of the pump exerted in the space 12 may be as high as 2300 pounds per square inch. Accordingly, the space 14 has the utility of relieving the pressure of fluid which may be exerted against the packing device 15 and keeps the fluid pressure to which the packing device 15 may be subjected the same as the relatively low intake pressure of the pump. As shown in Fig. 2, the sealing device 11 comprises a rotary part 23 which may be formed directly upon the shaft 24 of the pump but is generally a separate member, as shown, in order that it may be cheaply made and of a metal selected for this purpose. The rotary part 23 is therefore shown in the form of a sleeve adapted to be held against a collar 25 formed on the shaft 24 by means of a sleeve 26 which is threaded upon the shaft and which may pass through the packing device 15 so as to provide a removable wear receiving surface for the shaft 24 where such shaft is engaged by the packing material 16 of the packing device 15. In its preferred form the rotary part 23 has a cylindrical face 27 of large diameter adjacent the front end 28 thereof which is disposed toward the high pressure zone 12 of the pump 13, and has a cylindrical face 30 of relatively small diameter at the rear end 31 thereof disposed toward the low pressure zone 14 of the pump 13. The relatively large and small cylindrical faces 27 and 30 are connected at substantially the center of the member 23 by an intermediate annular face 32 which is preferably disposed at an angle of 45° as shown.

In a position essentially surrounding the rotary part 23 is a stationary member 33 consisting of a body 34 having a cylindrical counterbore 35 in the forward end thereof and a ring 36 secured to the forward end thereof by means of screws 37, the inner portion 38 of the ring 36 extending inwardly across the leftward or forward end of the counterbore 35 so as to provide a front end face or wall 40 for the recess 35 which is annular and faces radially inwardly toward the intermediate portion of the rotary part 23. The rightward or rearward end of the body 34 has a bore 41 which fits relatively closely to the small cylindrical face 30 of the rotary part 23 and is consequently of smaller diameter than the opening 42 through the ring 36. The rear end wall 43 of the recess 35 is accordingly of greater radial dimension than the front end wall 40 of the stationary member 33 provided by the ring 36 which forms a part thereof. In order that the stationary member 33 may have a universal movement, it is provided with a spheroidal face 44 generated on a radius R from a point P situated on the axis A—A and within the leftward or forward part of the body 34. The spheroidal face 44 forms a seating face disposed toward the low pressure zone 14, and such seating face is received by an internal spheroidal seating face 45 formed in a ring 46 and around the point P as indicated by the radius R, such spheroidal face 45 being disposed or facing toward the high pressure zone 12. The supporting ring 46 may have a flange 47 at the forward end thereof through which screws 48 may be extended for the purpose of securing it, as shown in Fig. 1, in an opening 50 in the dividing wall 51 of the pump 13 which separates the spaces or zones 12 and 14. To substantially close the front end of the space 52 formed within the supporting member 46, an annular cover plate 53 may be provided, and to force the stationary member 33 toward the seating face 45 a number of flat springs 54 may be secured, in a position to engage the leftward or front face of the ring 36, by screws 55 which hold the cover plate 53 in place.

Around the intermediate portion of the rotary part 23 and within the recess 35, an axially elongated sealing ring 56 is placed, this sealing ring 56 having a bore 57 at its leftward or forward end corresponding to the diameter of the cylindrical face 27 of the rotary part 23, and having a bore 58 at its rearward end corresponding in diameter to the bore 41 at the rearward end of the body 34. The bores 57 and 58 are connected by a sloping annular face 60 which is spaced lightwardly from the annular face 32 when the parts of the sealing device are disposed in their normal operating positions. To minimize leakage of fluid through the interior of the sealing ring 56, a packing means is employed between such ring 56 and the rotary part 23, such packing means having preferably the form of a metal piston ring 61 mounted in a groove 62 formed in the cylindrical face 27 adjacent the intermediate face 32, the groove 62 being slightly larger in cross section than the ring 61 so that fluid under pressure may readily enter the leftward part of the groove 62 and pass into the space under the ring 61, so as to force the ring 61 rightwardly and outwardly against the sealing ring 56, thereby frictionally engaging the ring 56 in such a manner as to cause the ring 56 to rotate with the rotary part 23. The leftward or forward end of the ring 56 has an end face 64 to cooperate with the front end wall 40 of the stationary member 36, and at the rightward or rearward end of the ring 56 is provided with an annular face 65 disposed adjacent the bore 58 and cooperating with the inner portion of the rear end wall 43. The axial dimension of the ring 56 between the faces 64 and 65 is slightly less than the dimension between the walls 40 and 58 of the recess 35. Outside the annular face 65 the rearward end of the sealing ring 56 is relieved or stepped leftwardly as shown so as to provide a radial annular face 68 confronting an annular fluid or pressure chamber 70 which is thereby formed between the rearward end of the sealing ring 56 and the rear end wall 43 of the recess 35. The area of the face 68 confronting the pressure chamber 70 is preferably the same as the area of the face 64 in engagement with the front end wall 40.

The operation of the sealing device is as follows:

Fluid under pressure from the high pressure zone 12 enters the bore 42 of the ring 36 and forces rightwardly against the leftward end of the sealing ring 56, thereby moving the sealing ring 56 rightwardly in the recess 35. The fluid under pressure then passes radially outwardly between the front end wall 40 and the front face 64 of the sealing ring 56 and passes rightwardly in the annular space 75 around the sealing ring 56 to the annular pressure chamber 70 wherein it exerts a pressure leftwardly or forwardly against the face 68 which is preferably of the same size as the end face 40 of the sealing ring 56. The pressure on the ends of the sealing ring 56 now becomes substantially balanced so that the fluid in forcing its way radially inwardly from the pressure chamber 70 between the rear end face 65 and the rear end wall 43 may readily move the sealing ring 56 in leftward direction. This leftward movement of the sealing ring 56 will continue until the sealing ring 56 is in a position substantially centralized between the ends of the recess 35, and when it is so positioned, very thin radial passages will be maintained between the front end wall 40 and the front end face 64 and between the rear end wall 43 and the rear end face 65, through which the fluid will pass continuously from the high pressure zone 12 to the low pressure zone 14, but at a relatively slow rate. It will be noted that there is a space 75 around the sealing ring 56 within the recess 35 so that the sealing ring 56 may have a radial movement in the recess should the shaft 24 become disaligned, this movement occurring without changing the character of the fluid passages existing at the ends of the sealing ring 56. Also, it will be perceived that the plane of rotation of the sealing ring 56 determines the position of adjustment of the stationary member 33 which is mounted for universal movement in the mounting member 46. Also, the sealing ring 56 may move relative to the rotary part 23, and accordingly will retain its proper position of operation in the recess 35, even though the shaft 24 should move so as to in turn move the rotary part 23 in an axial direction. In Fig. 2 we have shown the manner of forming the annular pressure chamber 70 by stepping back the rightward end of the sealing member 56. To indicate that the balancing pressure chamber may be otherwise formed, we have in Fig. 4 shown the rightward end of a sealing ring 56a in which the end face 65a is continuous and radial, the annular pressure chamber 70a being formed by undercutting the end wall 43a of a stationary member 33a. In this form of the invention, the results attained are the same as accomplished in the structure shown in Fig. 2, but the machining of the recess 35a in the form of the invention shown in Fig. 4 may be a little more difficult.

Although we have herein shown and described our invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

We claim as our invention:

1. A seal of the character described, including: a primary part having an annular face; a secondary member in overlapping relation to said primary part, said secondary member having an annular recess therein facing said annular face of said primary part, said parts being relatively rotatable; and a sealing ring in said annular recess, said sealing ring having in said recess a rearwardly presented area greater than its forwardly presented area, having an axial dimension slightly less than the axial dimension of said annular recess and being axially movable relative to said primary part, there being sealing means operative between said sealing ring and said annular face of said primary part permitting relative axial movement of said primary part and said sealing ring.

2. A seal of the character described, including: a rotary member; a stationary member disposed around said rotary member, one of said members having an annular recess therein facing the other of said members; and a sealing ring in said annular recess, said sealing ring having in said recess a rearwardly presented area greater than its forwardly presented area, having an axial dimension slightly less than the axial dimension of said annular recess and being axially movable therein, there being an annular sealing member between said sealing ring and said other of said members resisting a flow of fluid through the space between such member and said sealing ring.

3. A seal of the character described, including: a rotary member; a stationary member disposed around said rotary member, one of said members having an annular recess therein facing the other of said members; means for adjustably securing said stationary member in its operative position so that it may axially align with said rotary member; and a sealing ring axially movable relative to said other of said members and operating in said annular recess, said sealing ring having in said recess a rearwardly presented area greater than its forwardly presented area, having an axial dimension slightly less than the axial dimension of said annular recess and being axially movable therein, there being sealing means operative between said sealing ring and said other of said members.

4. A seal of the character described, including: a rotary part having a circumferential face; a stationary member disposed around said rotary part, said stationary member having an annular recess therein facing said circumferential face of said rotary part; means for adjustably securing said stationary member in its operative position so that it may axially align with said rotary part; and a sealing ring axially movable on said rotary part and in said annular recess, said sealing ring having in said recess a rearwardly presented area greater than its forwardly presented area, having an axial dimension slightly less than the axial dimension of said annular recess and being axially movable on said rotary part, there being a sealing member between said sealing ring and said rotary part resisting a flow of fluid through the space between said rotary part and said sealing ring.

5. A sealing device of the character described, for use between a high pressure zone and a low pressure zone, including: a rotary part having a circumferential face disposed between said high pressure zone and said low pressure zone; a stationary member around said rotary part, said member having an annular recess facing said circumferential face of said rotary part, and said stationary member having a front end wall for said recess disposed toward said high pressure zone and a rear end wall for said recess disposed toward said low pressure zone; and a sealing ring axially movable on said circumferential face of said rotary part and being disposed within said recess, said sealing ring having a front face at its front end to cooperate with said front end wall of said recess and a rear face at the rear end thereof to cooperate with said rear end wall of said recess, there being a pressure chamber formed between said rear end of said sealing ring and said rear end wall and a passage for conducting to said pressure chamber the fluid which has passed between said front face and said front end wall, said pressure chamber being of such size that the pressure therein will act to force said sealing ring toward said high pressure zone.

6. A sealing device of the character described, for use between a high pressure zone and a low pressure zone, including: a rotary member disposed between said high pressure zone and said low pressure zone; a stationary member around said rotary member, one of said members having an annular recess facing the other of said members and said recess having a front end wall disposed toward said high pressure zone and a rear end wall disposed toward said low pressure zone; a sealing ring axially movable within said recess, said sealing ring having a front face at its front end to cooperate with said front end wall of said recess and a rear face at the rear end thereof to cooperate with said rear end wall of said recess, there being a pressure chamber formed between said rear end of said sealing ring and said rear end wall and a passage for conducting to said pressure chamber the fluid which has passed between said front face and said front end wall, said pressure chamber being of such size that the pressure therein will act to force said sealing ring toward said high pressure zone; and sealing means operative between said sealing ring and said other of said members, said sealing means being of a character to permit axial movement of said sealing ring relative to said other of said members.

7. A sealing device of the character described, for use between a high pressure zone and a low pressure zone, including: a rotary part having a circumferential face disposed between said high pressure zone and said low pressure zone; a stationary member around said rotary part, said member having an annular recess facing said circumferential face of said rotary part, and said stationary member having a front end wall for said recess disposed toward said high pressure zone and a rear end wall for said recess disposed toward said low pressure zone; means for adjustably securing said stationary member in its operative position so that it may axially align with said rotary part; and a sealing ring axially movable on said circumferential face of said rotary part and being disposed within said recess, said sealing ring having a front face at its front end to cooperate with said front end wall of said recess and a rear face at the rear end thereof to cooperate with said rear end wall of said recess, there being a pressure chamber formed between said rear end of said sealing ring and said rear end wall and a passage for conducting to said pressure chamber the fluid which has passed between said front face and said front end wall, said pressure chamber being of such size that the pressure therein will act to force said sealing ring toward said high pressure zone.

8. A sealing device of the character described, for use between a high pressure zone and a low pressure zone, including: a rotary part having a circumferential face disposed between said high pressure zone and said low pressure zone; a stationary member around said rotary part, said member having an annular recess facing said circumferential face of said rotary part, said stationary member having a front end wall for said recess disposed toward said low pressure zone, and said stationary member having a spheroidal seating face disposed toward said low pressure zone; means for adjustably holding said stationary member in operative position, comprising a wall having a spheroidal seating face disposed toward said high pressure zone in a position to receive said seating face of said stationary member and to universally support the same; resilient means for forcing said stationary member toward said seating face of said wall; and a sealing ring axially movable on said circumferential face of said rotary part and being disposed within said recess, said sealing ring having a front face at its front end to cooperate with said front end wall of said recess and a rear face at the rear end thereof to cooperate with said rear end wall of said recess, there being a pressure chamber formed between said rear end of said sealing ring and said rear end wall and a passage for conducting to said pressure chamber the fluid which has passed between said front face and said front end wall, said pressure chamber being of such size that the pressure therein will act to force said sealing ring toward said high pressure zone.

9. A seal of the character described, including: a rotary member; a stationary member disposed around said rotary member, one of said members having an annular recess therein facing the other of said members; and a sealing ring in said annular recess, said sealing ring being axially movable on said rotary member and having a bore of reduced diameter at its rearward end so that said sealing ring will present rearwardly an area greater than the forwardly presented area thereof, and said sealing ring having an axial dimension slightly less than the axial dimension of said annular recess and being axially movable therein, there being an annular sealing member between said sealing ring and said other of said members resisting a flow of fluid through the space between such member and said sealing ring.

10. A sealing device of the character described, for use between a high pressure zone and a low pressure zone, including: a rotary part having a large diameter cylindrical outer face at the end thereof toward said high pressure zone and a small diameter cylindrical outer face at the end thereof toward said low pressure zone, said cylindrical faces being connected by an intermediate annular face; a stationary member around said rotary part, said member having an annular recess facing said rotary part in a position surrounding said intermediate annular face and overlapping said cylindrical faces of said rotary part, said stationary member having a front end wall for said recess disposed toward said high pressure zone and a rear end wall for said recess disposed toward said low pressure zone; and a sealing ring in said recess, said sealing ring having a stepped bore corresponding in diameter at its front and rear ends to the diameters of said cylindrical outer faces of said rotary part, and said sealing ring having an annular front face at its forward end to cooperate with said front end wall of said recess and an annular rear face at its rearward end, of substantially the same size as said front face, to cooperate with the inner part of said rear end wall of said recess, there being an annular pressure chamber formed between the rear end of said sealing ring and said rear end wall of said recess, and a passage from said pressure chamber to the forward end of said recess through which fluid that has passed the front face of said sealing ring may flow to said pressure chamber and act in said pressure chamber to force said sealing ring toward said front end wall of said recess, there being sealing means operative between said sealing ring and said rotary part to resist passage of fluid through the bore of said sealing ring.

11. A sealing device of the character described, for use between a high pressure zone and a low pressure zone, including: a rotary part having a large diameter cylindrical outer face at the end thereof toward said high pressure zone and a small diameter cylindrical outer face at the end thereof toward said low pressure zone, said cylindrical faces being connected by an intermediate annular face; a stationary member around said rotary part, said member having an annular recess facing said rotary part in a position surrounding said intermediate annular face and overlapping said cylindrical faces of said rotary part, said stationary member having a front end wall for said recess disposed toward said high pressure zone and a rear end wall for said recess disposed toward said low pressure zone; and a sealing ring in said recess, said sealing ring having a stepped bore corresponding in diameter at its front and rear ends to the diameters of said cylindrical outer faces of said rotary part, and said sealing ring having an annular front face at its forward end to cooperate with said front end wall of said recess and an annular rear face at its rearward end, of substantially the same size as said front face, to cooperate with the inner part of said rear end wall of said recess, there being an annular pressure chamber formed between the rear end of said sealing ring and said rear end wall of said recess, and a passage from said pressure chamber to the forward end of said recess through which fluid that has passed the front face of said sealing ring may flow to said pressure chamber and act in said pressure chamber to force said sealing ring toward said front end wall of said recess, there being a piston ring operative between said sealing ring and said rotary part to resist passage of fluid through the bore of said sealing ring.

12. A seal of the character described, including: a rotary member; a stationary member disposed around said rotary member, one of said members having an annular recess therein facing the other of said members; means for adjustably securing said stationary member in its operative position so that it may axially align with said rotary member; and a sealing ring in said annular recess, said sealing ring being axially movable on said rotary member and having a bore of reduced diameter at its rearward end so that said sealing ring will present rearwardly an area greater than the forwardly presented area thereof, and said sealing ring having an axial dimension slightly less than the axial dimension of said annular recess and being axially movable therein, there being sealing means operative between said sealing ring and said other of said members.

13. A seal of the character described, including: a primary part having an annular face; a secondary member in overlapping relation to said primary part, said secondary member having an annular recess therein facing said annular face of said primary part, said parts being relatively rotatable; and a sealing ring in said annular recess, said sealing ring having an axial dimension slightly less than the axial dimension of said annular recess and being axially movable relative to said primary part, and said sealing ring having its rearward end of larger area than its forward end and being so formed that a pressure chamber is formed adjacent said rearward end connected so as to receive fluid under pressure from the forward end of said recess, there being sealing means operative between said sealing ring and said annular face of said primary part.

14. A seal of the character described, including: a primary part having an annular face; a secondary member in overlapping relation to said primary part, said secondary member having an annular recess therein facing said annular face of said primary part, said parts being relatively rotatable; and a seaeling ring in said annular recess, said sealing ring having an axial dimension slightly less than the axial dimension of said annular recess and being axially movable relative to said primary part, and said sealing ring having its rearward end of larger area than its forward end and being so formed that a pressure chamber is formed adjacent said rearward end connected so as to receive fluid under pressure from the forward end of said recess.

GEORGE E. BIGELOW.
ARTHUR R. WEIS.